Patented Jan. 15, 1929.

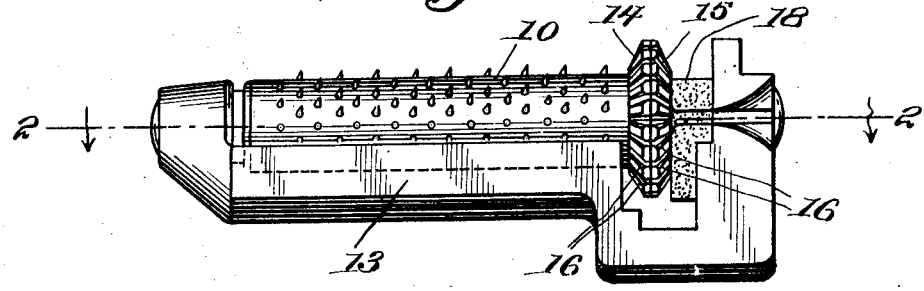
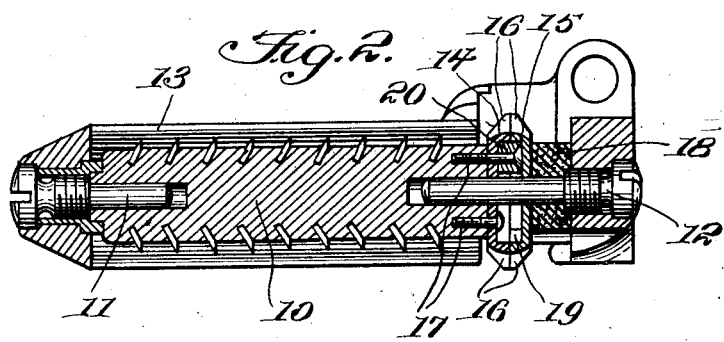
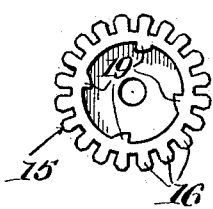 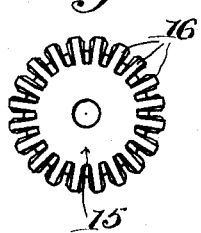 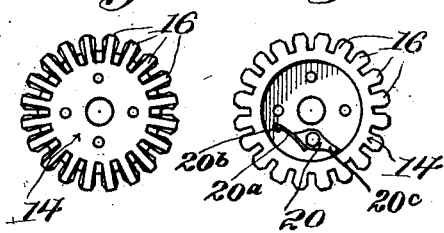

1,699,442

UNITED STATES PATENT OFFICE.

RANDOLPH RAY NIX AND WALTON FRANKLIN DAVIS, OF SHELBY, NORTH CAROLINA.

THREAD-CUTTING DEVICE FOR LOOMS.

Application filed January 23, 1926. Serial No. 83,289.

This invention relates to improvements in thread cutting devices for looms and has for its object the provision of a device for permitting the cutting off of the threads which extend beyond the selvage edge of a woven cloth.

The primary object of the invention is to provide a device for this purpose in which the cutting edges of the thread cutter change at each operation of the temple roll, so that a new and sharp cutting edge is presented and efficient operation of the cutting device is thus insured.

Another object of the invention is to provide a thread cutter for looms having two coaxially mounted cutting members provided with peripheral notched teeth closely related with cutting edges to effect a shearing cut on opposite relative motion and providing a clutch between the cutting members to permit them to run relatively free in one movement of direction of the temple roll.

The invention therefore may be defined broadly as a thread cutter for vibratory temples, said cutter having two coacting members each provided with notched cutting edges, said members being so connected with the temple that they are both driven by it in one direction, but one is free for movement in the other direction. It comprises other more specific features, the novelty of which will be hereinafter described and will be definitely indicated in the appended claims.

In the drawings:—

Figure 1 is a front elevation illustrating the loom temple with the invention applied;

Figure 2 is a section on the line 2—2 of Figure 1;

Figures 3 and 4 are opposite face views of the cutter member having movement in one direction only;

Figures 5 and 6 are similar views of the cutting member carried by the roll.

Referring now in detail to the drawings wherein like characters of reference indicate corresponding parts, 10 indicates a temple roll which is mounted upon journals 11 and 12 at opposite ends thereof. These journals are located at the opposite ends of the pod 13 and constitute adjusting screws to form a pivotal point for the roll in the usual manner.

The thread cutter comprises a pair of steel disks 14 and 15 each of which is provided with a plurality of peripheral notches forming abutting teeth 16 through which notches the selvage thread passes to be severed when there is a change in bobbins. The member 14 is secured to and movable with the temple roll 10 by the screws 17. The temple roll rotates freely on the journals 11 and 12 and the confronting edges of the several teeth are sharpened to afford on relative movement of the disks a shearing cut of the threads. A vulcanized rubber washer 18 bears against the cutter member 15 and holds the entire temple roll seated against the rear end of the pod 13 under pressure by reason of the rubber washer 18 and the adjustment of the screws 11 and 12, thus effecting an elastic engagement between the two disk cutters by adjusting the journal 12 and a very elastic engagement between the cutting disks is thus effected. The adjusting screws 11 and 12 are shown driven home and no further adjustment is possible with the screws in the position shown, but with the screws not seated so deeply, then upon further advance of the screws, adjustment between the disks 14 and 15 is effected. In the hollow space between the two cutters is housed a dog 20 pivotally mounted with relation to the member 14 on one of the screws 17, the elastic tip of which, as indicated at 20ª in Figure 6 fits against a projection 20ᵇ and the tip 20ᶜ of the dog 20 is broad enough to lie in the plane of a plurality of radial abutments 19 on the inner face of the companion disk 15 in such relation that when movement of the member 14 is effected in one direction the portion 20ᶜ of the dog will ride over the sloping edge of the circumferential abutment 19 but it will check it in the opposite direction and the edge of the dog will catch and find a seat on the right angular edge of the abutment.

It will thus be seen that the rotation of the temple roll in one direction will cause the two shearing disks to move in unison but when rotated in the opposite direction the dog will ride over the sloping edges of the abutment 19, thus carrying the member 14 relatively to the member 15 and producing a cutting action, the new cutting teeth being brought into use by both of the disks moving in unison. In other words, with the cloth moving normally through the temple roll the dog at times engages the radial projections 19 and moves the two disks in unison, but the back and forth motion of the cloth causes a relative motion between the two disks for a great portion of the time and it is only at times that the two disks are moved in unison to present new cutting teeth. Thus by automatic action of the temple roll a keen cut of the thread is always effected due to the large number of peripheral teeth, thus assuring a relatively long life of the sharpened teeth and necessitating less removal of same for sharpening. The travel of the cloth through the temple pod will cause the burr 10 to rotate in one direction and this will not affect the movement of the cutting member 15 and the portion 20° of the dog will ride over the sloping edges of the peripheral projections 19, but each time the cloth moves in the opposite direction through the temple pod there will be produced a back action and the burr 10 being in engagement with the cloth will cause this burr 10 to move in the opposite direction and when the portion 20° is fitting against the right angle portion of the projection 19 or any one of them, there will be imparted a partial rotation to the member 15, and thus a new set of cutting teeth will be presented on this member.

The invention is susceptible of various changes in its form, proportion and minor details of construction and the right is herein reserved to make such changes as properly fall within the scope of the appended claims.

We claim—

1. A thread cutter for vibratory temples, said cutter having two coacting members, each provided with notched cutting edges, said members so connected with the temple that they are both driven by it in one direction, but one is free for movement in the other direction and provided with means to permit such movement.

2. A thread cutter for vibratory temples, said cutter having two coacting members, each provided with notched cutting edges, said members being so connected with the temple that they are both driven by it in one direction, but one is free for movement in the other direction and provided with means to prevent such movement.

3. A thread cutter for loom temples comprising toothed concentric thread cutting members, one of the thread cutting members being fixed to the temple roll and the other thread cutting member being rotatable with relation to the temple roll, means for holding the thread cutting members in shearing relation, and means for operating the thread cutting members as a unit in one direction of roll movement, and separately in opposite direction of roll movement.

4. A loom temple carrying two coaxial multiple toothed thread cutting members, one of the members being fixed to the temple roll to rotate therewith, and the other member being resiliently mounted in the temple and having a slip connection with the member on the temple roll, the two members being held in elastic engagement with each other to provide a shearing cut, the slip connection between the members comprising a dog positioned between the two cutting members to lock the two members together in one direction of roll movement and to slip relatively in an opposite direction of roll movement.

5. The combination with a loom temple having a thread cutting device including two multiple toothed cutting members, one of the members being attached to the temple roll, the other member being secured in a resilient manner in the temple, both members being adapted to rotate together in one direction of roll movement, and means to release one of the cutter members from rotation and to hold the same stationary when the roll is rotated in the opposite direction.

6. The combination with a loom temple having a thread cutting device including two cutter members with peripheral multiple shearing teeth, means to attach one of the cutter members to the temple roll to rotate therewith, means for resiliently holding the other cutter member in the temple, and a dog positioned between the cutter members adapted to lock the members together in one direction of roll movement and to permit a relative shifting of the cutter members in an opposite direction of roll movement.

7. A loom temple carrying two coaxially mounted thread cutting members with multiple radial shearing teeth, one member having a fixed relation to the temple roll and the other member being resiliently mounted in the temple to prevent rotation with the first cutting member in one direction of roll movement, and a slip connection between the two cutting members adapted to become operative to shift the two members in unison on opposite direction of roll movement.

8. In a loom temple, a temple roll, a multiple toothed cutter secured on one end of the temple roll, a second multiple toothed cutter resiliently secured in the temple and being adapted to press against the first cutter and being held against rotation in one direction, slip connections between the two cutter members to allow relative movement in one direction of roll movement between the cutter members and to allow unitary movement of the cutters in another direction of roll movement.

In testimony whereof we affix our signatures.

RANDOLPH RAY NIX.
WALTON FRANKLIN DAVIS.